Oct. 1, 1963 R. H. KUNZ 3,105,518
MULTI-PORT VALVE OPERATOR
Filed March 23, 1959 8 Sheets-Sheet 3

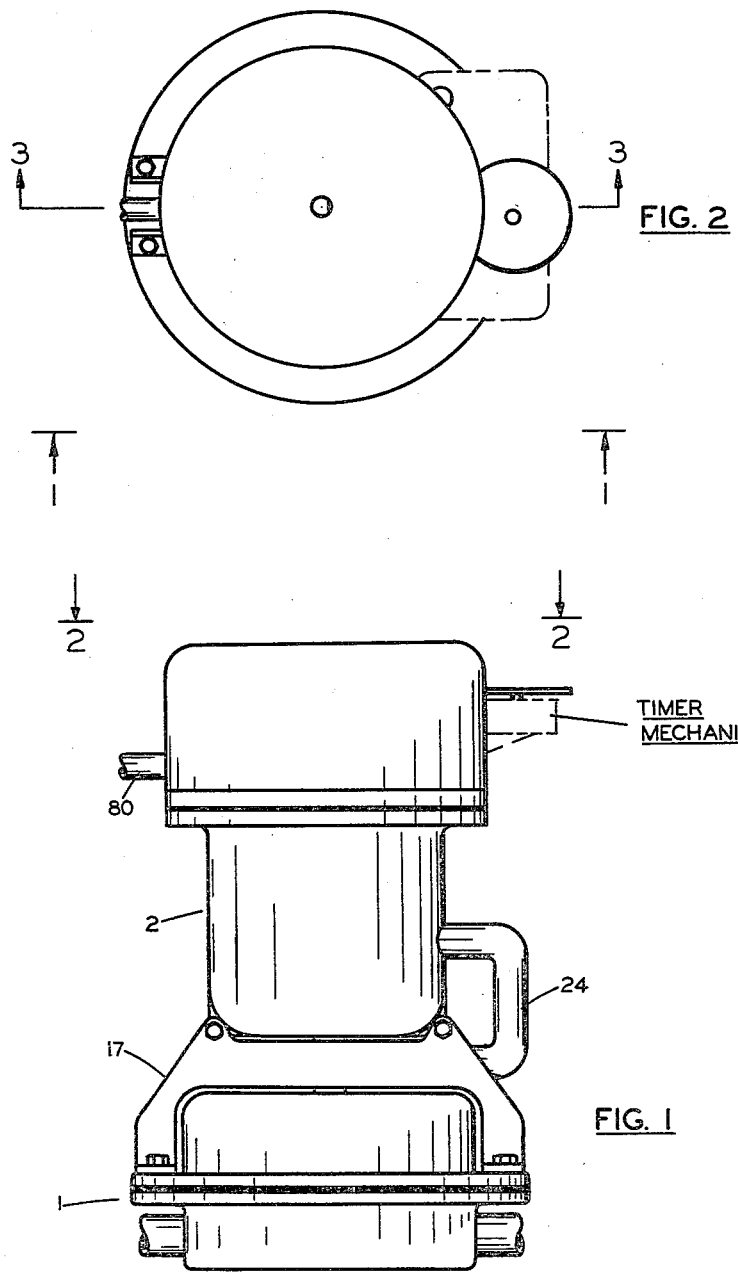

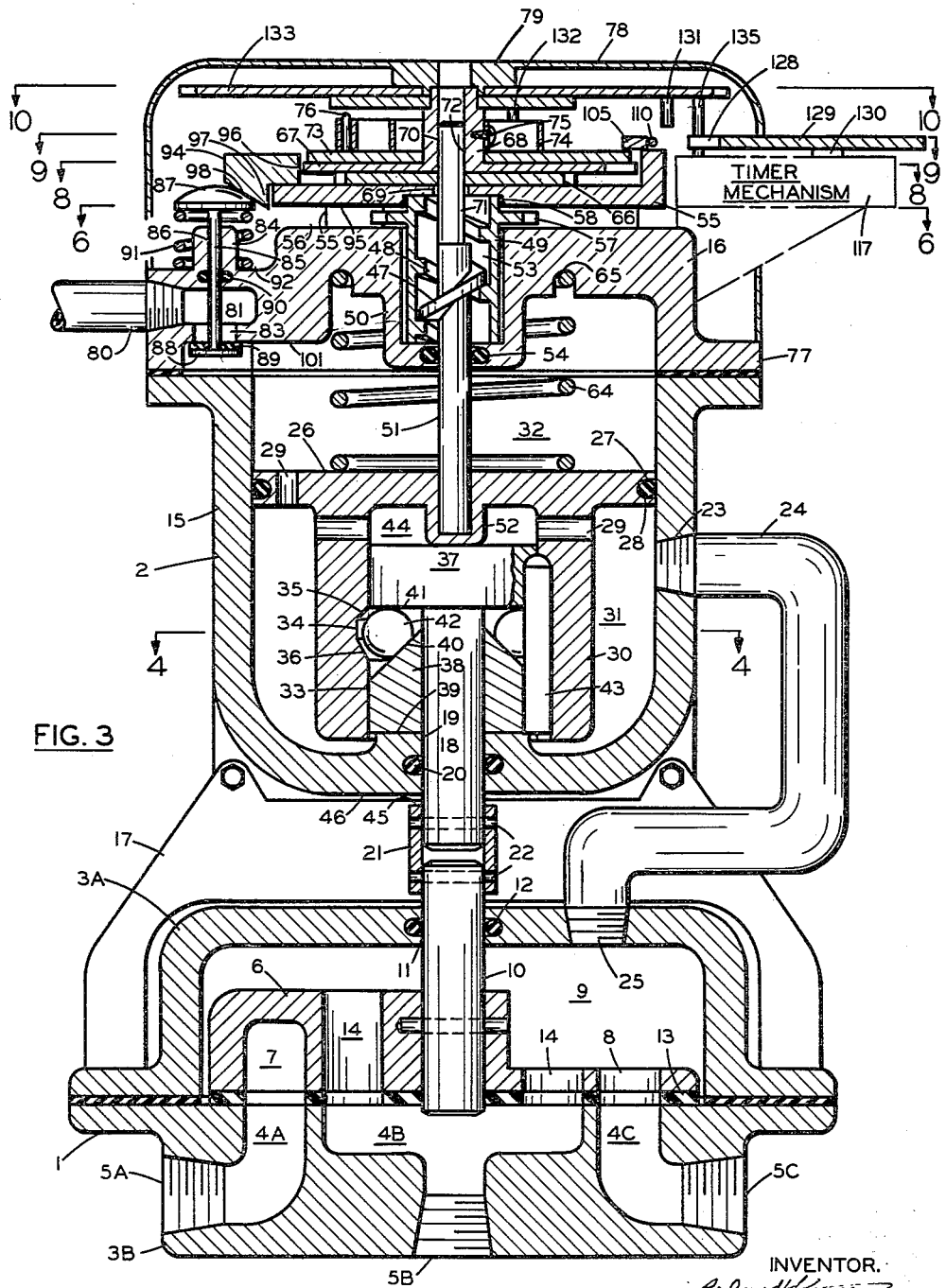

INVENTOR.
Robert H. Kunz
BY

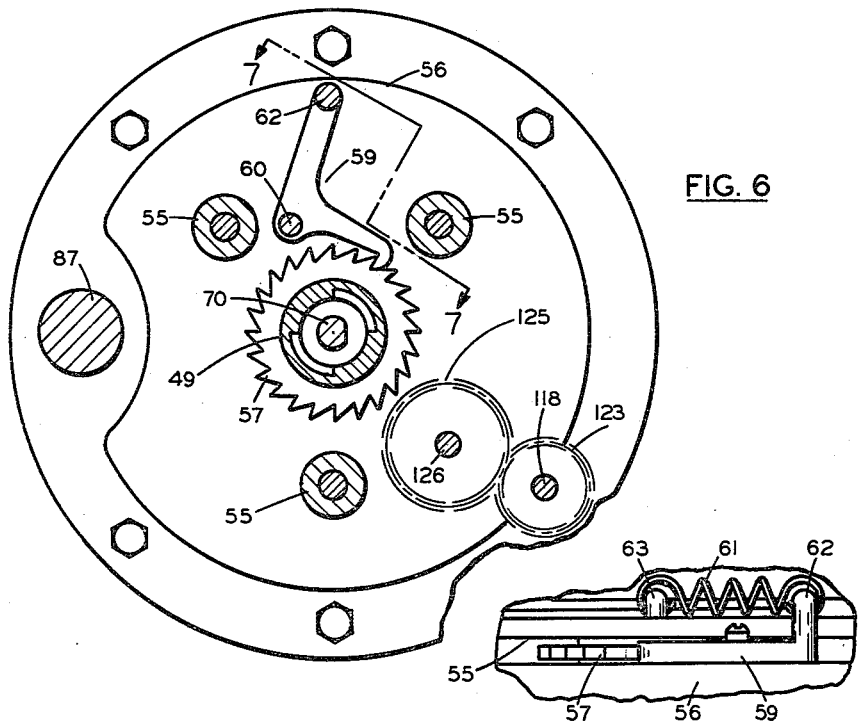
FIG. 6
FIG. 7
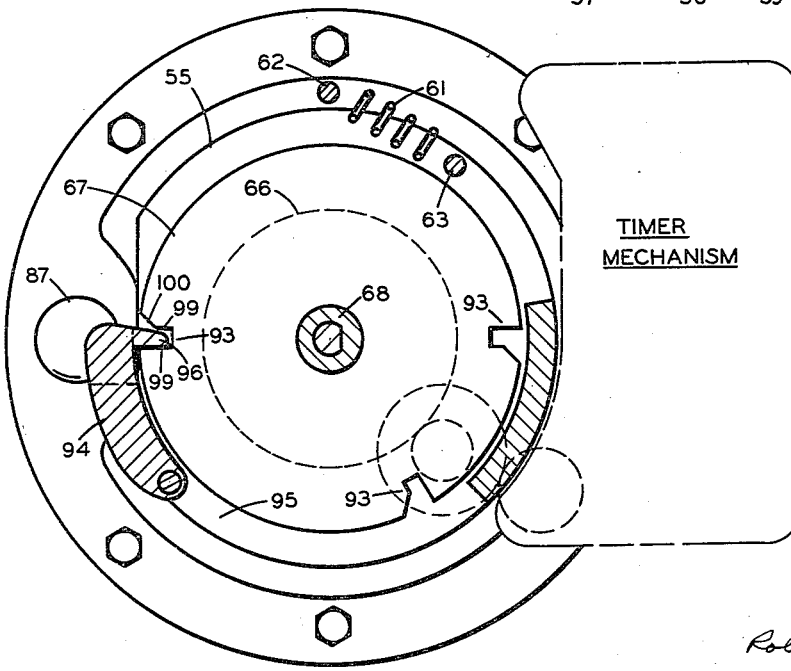
TIMER MECHANISM
FIG. 8
INVENTOR.
Robert H. Kunz
BY

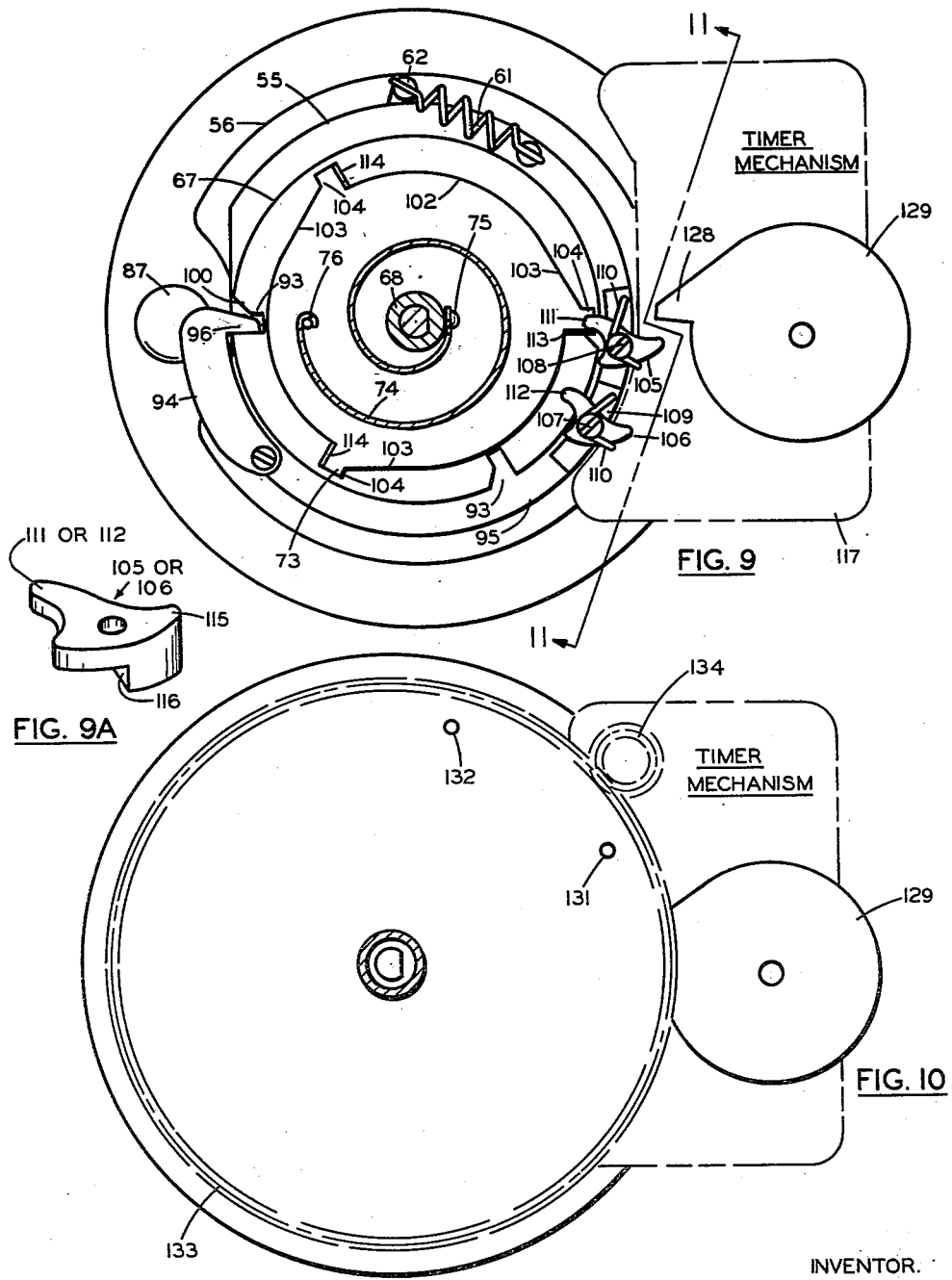

Oct. 1, 1963 R. H. KUNZ 3,105,518
MULTI-PORT VALVE OPERATOR
Filed March 23, 1959 8 Sheets-Sheet 8

INVENTOR.
Robert H. Kunz
BY

United States Patent Office 3,105,518
Patented Oct. 1, 1963

3,105,518
MULTI-PORT VALVE OPERATOR
Robert H. Kunz, 389 Park St., Elgin, Ill.
Filed Mar. 23, 1959, Ser. No. 801,210
3 Claims. (Cl. 137—624.14)

This invention relates to valve mechanisms, and more particularly to a multi-port valve assembly having a rotary valve element which is rotatable to different operative positions so as to channel the flow of fluid through the valve in accordance with a desired scheme.

A main object of the invention is to provide a novel and improved method of operating multi-port valve assemblies which is relatively simple in construction, and which utilizes the pressure of the fluid conveyed through the valve as the operating means, eliminating the necessity of providing electric motors, gearing, or other complex mechanisms for rotating the valve element.

A further object of the invention is to provide an improved operator for multi-port valve assemblies of the type employing a ported valve element rotatably mounted therein, the operator employing a pressure difference across an element associated with the rotary valve element for operating same, and being provided with relatively inexpensive means for intermittently rotating the valve element.

A still further object of the invention is to provide an improved multi-port valve operator that is smooth in operation over a wide range of fluctuating pressures, that is easy to maintain in operating condition, and that provides a clear indication of each stage of operation of the valve.

A main object of the invention is to provide an improved operator for multi-port valve assemblies of the type employing a ported valve element rotatably mounted therein, the operator providing a means for first unseating the valve elment a short distance from its seat prior to rotation thereof, and thereafter rotating the valve element without further unseating same.

Another main object of the invention is to provide a multi-port valve operator for rotating the valve element associated with the mechanism through different operative positions in accordance with a desired scheme, the operator including a spring driven, self-winding mechanism for intermittently and at times actuating the driving mechanism.

A still further object of the invention is to provide a multi-port valve operator which may be mounted in various positions, being arranged so that it will operate over long periods of time without requiring readjustment or replacements of parts.

Further objects and advantages of the invention will become apparent from the following description and claims, and from the accompanying drawing, wherein:

FIGURE 1 is a horizontal side view of a multi-port valve and valve operator attached thereto, said view being substantially on the line 1—1 of FIGURE 2.

FIGURE 2 is a front view of the assembly shown in FIGURE 1, taken on the line 2—2.

FIGURE 3 is an enlarged, horizontal cross sectional view taken on the line 3—3 of FIGURE 2.

FIGURE 6 is a sectional view taken along the line 6—6 of FIGURE 3.

FIGURE 7 is a partial elevation view taken along the line 7—7 of FIGURE 6.

FIGURE 8 is a sectional view taken along the line 8—8 of FIGURE 3.

FIGURE 9 is a sectional view taken along the line 9—9 of FIGURE 3.

FIGURE 9a is a detail of the latch elements 105 and 106 of FIGURE 9.

FIGURE 10 is a sectional view taken along the line 10—10 of FIGURE 3.

Figure 4:
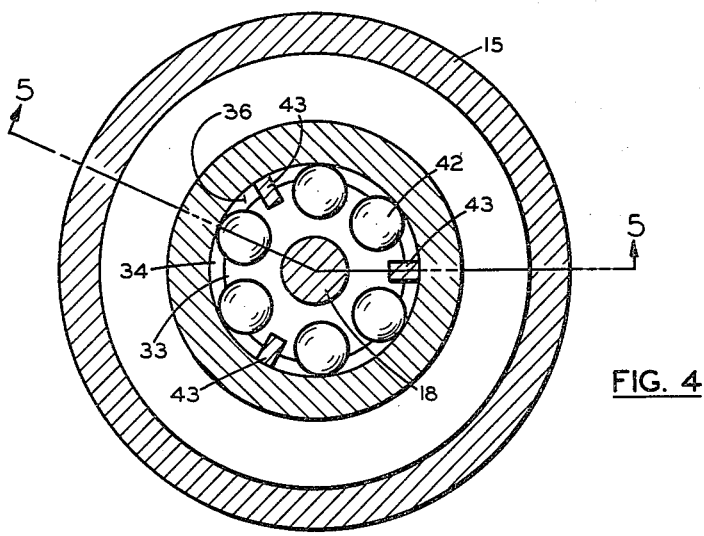
FIGURE 4 is a cross sectional view taken on the line 4—4 of FIGURE 3.

Referring to FIGURE 1, 1 generally designates a multi-port valve assembly often encountered in conjunction with a water softener or similar installation wherein it is desired to obtain a definite cycle of different connections between a plurality of fluid connections as required to perform the respective successive operations of the equipment. Thus, the equipment may include a water softener tank which at times must be connected so the flow is directed through the successive stages of regeneration, namely, wash, salt and rinse flows, followed by treated "soft" water flow to service.

2 generally designates an operator for driving the valve element associated with the multi-port valve assembly 1 from one operating position to the next, and 17 designates a mounting bracket for attaching the operator 2 to the multi-port valve assembly 1.

Referring to FIGURE 3, the valve assembly 1 includes a housing member 3A in the form of a generally cylindrical chamber which is sealingly connected to the body member 3B. The body member 3B is formed with a plurality of chambers 4A, 4B, and 4C, etc., and conduit connections 5A, 5B, and 5C, etc., whereby the body member 3B may be connected as required to perform the respective successive operations of the equipment. Sealing gasket 13 is secured to body member 3B and provides a seat for a rotary valve element 6 contained within the housing member 3A.

Valve element 6 is formed with the valve chamber 7 of substantial angular width which establishes communication between various chambers 4 of body member 3B. Valve element 6 is further formed with the port 8 which places the space 9 in housing member 3A in communication with chambers 4 in body member 3B. Valve element 6 is adapted to be rotated into positions establishing communication between various adjacent chambers 4 in body member 3B, and to establish communication between space 9 and chambers 4 in body member 3B through port 8. Thus, fixed to valve element 6 is the shaft 10 extending through a bore 11 formed centrally in the housing member 3A. A suitable sealing gasket 12 is provided in the bore 11 and around the shaft 10 to substantially seal the shaft 10 relative to the interior of the housing member 3A, but allows the shaft 10 to rotate and slide axially. Valve element 6 is therefore unseated from the gasket 13 and rotated whenever shaft 10 is retracted and turned.

As usually installed in water treatment applications, the raw, untreated supply is connected to conduit connection 5B thereby placing space 9, port 8, and chamber 4B in constant communication with the raw, untreated supply through the apertures 14 formed in the valve element 6.

As so far described, the apparatus conforms with a characteristic multi-port valve commonly encountered in water treatment applications wherein the valve element 6 is rotated relative to the body member 3B to establish the required connections between the various fluid passages associated with the apparatus.

Referring to FIGURE 3, the operator assembly 2 includes a generally cylindrical housing member 15 sealingly connected to a cover plate 16, the operator 2 being suitably attached to the multi-port valve assembly 1 by the mounting bracket 17. The drive shaft 18 extends through the bore 19 formed centrally in the housing member 15, a suitable sealing ring 20 being provided in the bore 19 and around the drive shaft 18 to substantially seal the shaft 18 relative to the interior of the housing member 15.

The drive shaft 18 is in axial alignment with the shaft 10, and connected thereto by the coupling 21 and transverse fastening pins 22. Housing member 15 is provided with the conduit connection 23, and conduit 24 connected thereto, the other end of conduit 24 being connected to a conduit connection 25 in the housing member 3A, whereby the space 9 in the housing member 3A is in constant communication with the interior of housing member 15. As will be seen, the valve element 6 is constrained to follow the movements of the drive shaft 18.

A fluid operated driving unit provides motive force for driving the valve element 6 from one operating position to the next. Thus, designated at 26 is generally circular plate member, rotatably and slidably contained within the housing member 15. The plate member 26 is formed with a peripheral groove 27 in which is mounted a suitable ring 28 which slidably engages the inside wall of housing member 15. As will be seen, plate 26 forms a space 31 in housing member 15, and a space 32 on the side opposite space 31, the spaces 31 and 32 being in communication through the restricting orifice 29. The assembly comprises a form of pressure sensitive element responsive axially to a pressure difference between the first space 31 and the second space 32.

A novel feature of my invention is the means provided to retract the rotary valve element 6 a fixed distance from its seat on sealing gasket 13 prior to rotation thereof. Thus, the plate member 26 is formed with the hollow, concentric hub 30 which is formed with the inner cylindrical surfaces 33 and 34, and the tapered surfaces 35 and 36 which are substantially in the form of a frustrum of a cone and join the surfaces 33 and 34. Drive shaft 18 extends into the hollow hub 30 and terminates in the enlarged portion 37 which slidably engages the inner, cylindrical surface 33 of the hub 30. Concentrically located around drive shaft 18 between the boss 39 on housing member 15 and the enlarged portion 37 of the drive shaft 18 is a sleeve element 38, bearing at one end against the boss 39 and slidably engaging the inner, cylindrical surface 33 of the hub 30. The end of the cylindrical sleeve element 38 located toward the enlarged portion 37 of the drive shaft 18 is formed with the tapered surface 40 which is substantially in the form of a frustrum of a cone with its base toward the boss 39 of the housing member 15.

Located in the space formed by the surface 40 of the cylindrical sleeve element 38, surface 41 of the enlarged portion 37 of the shaft 18, and the surfaces 34, 35, and 36 of the hub 30 are the spherical wedge elements 42. Key elements 43 slidably engage the hub 30, the enlarged portion 37 of the drive shaft 18, and the cylindrical sleeve element 38 whereby the drive shaft 18, and the cylindrical sleeve element 38 are constrained to rotate with the hub 30 but are free to move axially relative to each other.

Figure 5:
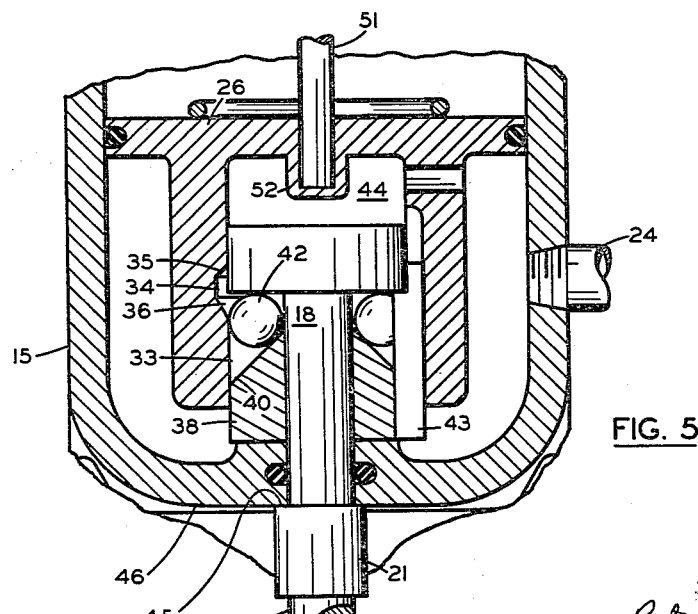
FIGURE 5 is a partial cross sectional view showing elements of FIGURE 3 in positions occupied during operation.
Figure 11:
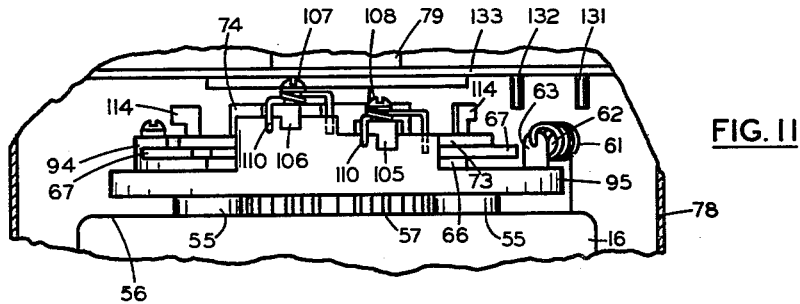
FIGURE 11 is a partial elevation taken along the line 11—11 of FIGURE 9.
Figure 12:
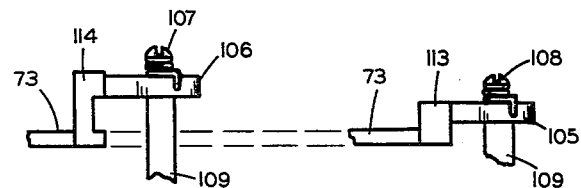
FIGURE 12 is a detail of the extensions 113 and 114 of FIGURE 9.

In operation, wedge elements 42 force drive shaft 18 toward space 44 whenever plate 26 and hub 30 move toward space 32. Thus, as shown in FIGURES 3 and 4, with the valve element 6 seated in normal operating position on gasket 13, wedge elements 42 are in contact with surface 41 of drive shaft 18, tapered surface 36, FIGURE 4, of hub 30, and tapered surface 40 of the cylindrical sleeve element 38. However, when plate element 26 and hub 30 move toward space 32, the tapered surface 36 of hub 30 forces the wedge elements 42 toward the center of the drive shaft 18, the tapered surface 40 of the cylindrical sleeve element 38 thus forcing the wedge elements 42 and the drive shaft 18 toward the space 44. When the cylindrical surface 33 of the hub 30 comes in contact with the surface of the wedge elements 42, as shown in FIGURE 5, further movement of the hub 30 toward the space 32 will not cause further movement of the wedge elements 42 toward the center of the drive shaft 18, and drive shaft 18 will not move further toward space 44 being constrained by the face 45 of coupling 21 contacting the surface 46 of housing member 15.

The co-operating screw threads 47 and 48 are provided as part of the fluid operated driving unit and cause rotary movements of the valve element 6 whenever the threads 47 and 48 are forced together in an axial direction as when a pressure difference on the plate member 26 moves the plate member 26 in an axial direction. Thus, the nut member 49 is formed with the internal thread 48, and is rotatably mounted in the hollow boss 50 of cover plate 16. Stem 51 is securely fixed in the boss 52 which is formed centrally on the plate member 26, the stem 51 extends through the nut member 49 and is formed with the helical thread 47 which is engageable with the helical thread 48 of nut member 49. The threads 47 and 48 being formed with the clearance 53 which provides suitable axial movement of the stem 51 and the plate 26 before the threads 47 and 48 engage. A suitable sealing ring 54 is provided in the wall of the boss 50 around the central aperture thereof to substantially seal the stem 51 relative to the interior of boss 50 but allows the stem 51 to slide axially.

The top portion of the nut member 49 is rotatably received in a guide block 55 which is secured on the wall 56 of cover plate 16. The nut member 49 is formed with an integral ratchet disc 57 located adjacent to the wall 56 of cover plate 16, the ratchet disc 57 being rotatable in a circular cavity 58 provided therefore in the guide block 55. A pawl member 59 is pivoted at 60, FIGURE 6, to the wall 56 and is biased into contact with the ratchet disc 57 by a coil spring 61, FIGURE 8, which is connected between an arm 62 provided on pawl member 59 and a post 63 formed thereabove on the guide block 55, as shown in FIGURE 7. Thus, the pawl member 59 engages the ratchet disc 57 thereby preventing the nut member 49 from clockwise rotation, as viewed in FIGURE 6, but allows the nut member 49 to rotate counter-clockwise.

A gear 66, FIGURES 3 and 8, and a rotatable element in the form of a notched register disc 67, FIGURES 3, 8, and 9, are located on the guide block 55, the notched register disc 67 being formed with a hollow hub 68. Stem 51 extends through the nut member 49, a circular opening 69 in the guide block 55, and is keyed to the gear 66 and the notched register disc 67. Thus, the top portion 70 of the stem 51 is formed with a flat portion 71, the central aperture 72 in gear 66, and the central aperture of the hollow hub 68 of the register disc 67, being correspondingly shaped so that they cannot rotate relative to the top portion 71 of stem 51, but allows the stem 51 to slide freely in an axial direction. The gear 66 and notched register disc 67 thus follow the rotation of the stem 51.

Loosely mounted on the hub 68 of the notched register disc 67 is a rotatable element in the form of a control plate 73. Spring 74 FIGURES 3 and 9, is securely fastened to the hub 68 at 75, and attached to the control plate 73 by the pin 76, thereby biasing the control plate 73 to counter-clockwise rotation, as viewed in FIGURE 9.

Secured to the flange 77, FIGURE 3, of the cover plate 16 is a concave cover 78 which is formed with a central, hollow hub 79. The hollow hub 79 engages the hub 68 of the notched register disc 67 whereby to restrain the register disc 67 and gear 66 from axial movement, and to provide a radial bearing for rotary movements of the hub 68.

A switch means to change the relative pressures on the plate member 26 thereby activating the driving unit is provided. Thus designated at 80, FIGURE 3, is a conduit connection that is in communication with a chamber 81 formed in the cover plate 16. Chamber 81 is in communication with the space 32 through the circular opening 83 formed in the wall 101 of the chamber 81. A portion of the wall 65 of cover plate 16, designated at 92, which forms a wall of chamber 81, is provided with a boss 84. Stem 85 extends through the circular opening 83 and the central aperture 86 of the boss 84 and terminates in the enlarged end 87. Affixed to the other end of stem 85, and located in the space 32 is a circular plate 88, a suitable gasket 89 being firmly attached to the plate 88. Plate 88 and gasket 89 are formed larger than the circular opening 83 whereby, when the gasket 89 is forced against the wall 101 of the chamber 81, the chamber 81 is sealed relative to the space 32. A suitable sealing ring 90 is provided in the wall of boss 84 around the stem 85 to seal the stem 85 relative to the chamber 81. Disposed around the boss 84 is a helical spring 91 bearing at one end against the enlarged portion 87 of the stem 85, and at the other end against the wall 92 of cover plate 16, whereby to bias the gasket 89 into sealing contact with the wall 101 of chamber 81.

As shown in FIGURE 8, the register disc 67 is formed with the notches 93 in its periphery corresponding to the various rotated positions of the valve element 6. A pawl member 94 is pivoted on the top flange 95 of the guide block 55 and is formed with the hooked end 96 and extension 97, FIGURE 3. The extension 97 is further formed with the face 98 which is in contact with the enlarged portion 87 of the stem 85, the face 98 being sloped so that when the pawl member 94 is rotated counter-clockwise, as viewed in FIGURE 8, the sloped face 98 depresses the enlarged portion 87 of the stem 85 thereby forcing the stem 85 to move the circular plate 88 and the gasket 89 away from the wall 101 of chamber 81 so as to place the chamber 81 in communication with the space 32.

The hooked end 96 of pawl member 94 is biased into engagement with the periphery of the notched register disc 67 by the spring 91 acting on the enlarged portion 87 of the stem 85 and the sloped face 98. However, when the hooked end 96 of the pawl member 94 comes into registry with one of the notches 93 so as to be received therein, the pawl member 94 rotates clockwise, biased thereto by the spring 91 as previously described, this action causing the circular plate 88 and gasket 89 to contact the wall 101 of chamber 81 thereby sealing space 32 relative to the chamber 81.

The notches 93 are formed with the parallel faces 99 and the sloped face 100 so that when the hooked end 96 of the pawl member 94 is received by one of the notches 93 the hooked end 96 prevents rotation of the register disc 67 thereby locking the valve element 6 in operating position. However, when the pawl member 94 is rotated counter-clockwise, as viewed in FIGURE 8, to partially remove the hooked end 96 from the notch 93, counter-clockwise rotation of the register disc 67 causes the sloped face 100 to contact the hooked end 96 thereby allowing the register disc 67 to rotate counter-clockwise until the hooked end 96 is received in the next notch 93, corresponding to the next operative position of the valve element 6.

The control plate 73 is formed, FIGURE 9, with the circular periphery 102 and the tangent portion 103 terminating in the extension 104, whereby when the control plate 73 rotates counter-clockwise, biased thereto by the sprial spring 74, the tangent portion 103 forces the pawl member 94 to rotate counter-clockwise, and the hooked end 96 to partially leave the notch 93. Rotation of the control plate 73 is prevented when the extension 104 contacts the hooked end 96. However, when the register disc 67 rotates counter-clockwise, the sloped face 100 causes the pawl member 94 to rotate until the hooked end 96 releases the extension 104 thereby allowing the control plate 73 to continue rotation, thereby allowing the register disc 67 to rotate counter-clockwise until the hooked end 96 is received in the next notch 93 corresponding to the next operative position of the valve element 6.

Rotation of the control plate 73 is controlled by the latches 105 and 106 which are pivoted at 107 and 108 to the boss 109 formed on the flange 95, and biased toward counterclockwise rotation by the springs 110. The latches 105 and 106 are formed with the hooked ends 111 and 112 which contact the extensions 113 and 114 formed on the control plate 73. Latch 105 is positioned to contact the extension 113 on control plate 73, and latch 106 is positioned to contact the extension 114. Latches 105 and 106 are further formed with the extension 115 which provide a means for rotating the latches clockwise, the extension 115 being formed with the boss 116 whereby the rotation of the latches is limited when the boss 116 contact the boss 109 on the flange 95.

In operation of the control means it will be noted that the space 31 in housing member 15 is in constant communication with the raw water supply space 9 in housing member 3A, and is therefore at water supply pressure. It will be further noted that conduit connection 80 in cover plate 16 is exposed to atmosphere so that space 32 in housing member 15 will be exposed to atmosphere whenever chamber 81 is in communication with space 32 through the circular opening 83. This occurs when the circular plate 88 and gasket 89 is moved away from the wall 101 of chamber 81. Since the water supply pressure in space 31 is substantially above atmospheric pressure, whenever space 32 is exposed to atmosphere the pressures on the opposite sides of the plate 26 become unbalanced, causing the plate 26 to move toward the space 32.

Referring to FIGURE 9, when the latch 105 is rotated clockwise, the extension 113 is released allowing the rotatable element, control plate 73, to rotate counter-clockwise until the extension 104 contacts the hooked end 96 of the pawl member 94, the tangent portion 103 of the control plate 73 forcing the pawl member 94 to rotate counter-clockwise thereby depressing the stem 85 and exposing the space 32 to atmosphere as previously described. The unbalance of pressures on the plate 26 causes the plate 26 to move toward space 32 thereby moving the valve element 6 a short distance from its seat on gasket 13, and then rotating the valve element 6 toward the next operative position. The rotatable element, register disc 67, follows the rotary movement of the valve element 6, the sloping face 100 of the notch 93 causing the pawl member 94 to rotate, this movement causing the hooked end 96 of pawl member 94 to release the extension 104 of the control plate 73 whereby the control plate 73 rotates until the extension 114 contacts the latch 106, thereafter being restrained from further rotation until the latch 106 is rotated clockwise. Register disc 67 and valve element 6 continue to rotate until the hooked end 96 of the pawl member 94 is received in the next notch 93. When the hooked end 96 is received in the next notch 93, the space 32 is sealed relative to the chamber 81 and the pressures across the plate 26 become balanced. Spring 64 thereafter biases the plate member 26 toward space 31 until the valve element 6 is again seated on gasket 13 in a new operating position.

Subsequent operating positions of the valve element 6 are controlled by the pins 131 and 132, and gear 133 hereinafter described. Thus when it is again desired to rotate the valve element 6 to its next operative position, the latch 106 is rotated clockwise by pin 131 releasing the control plate 73 whereupon the action heretofore described repeats, bringing the valve element 6 to the next operative position.

To again rotate the valve element 6 to its next operative position, the latch 106 is rotated clockwise by pin 132 releasing the control plate 73 whereupon the action heretofore described repeats, bringing the valve element 6 to the next operative position.

A novel feature of my invention is the spring driven, self winding means provided for intermittently and at predetermined times rotating the latches 105 and 106 clockwise, as viewed in FIGURE 9, thereby releasing the control plate 73 as previously described. Thus, indicated at 117, FIGURE 9, is a spring driven clock mechanism including the usual coil spring, gear train, and escapement, the unit being suitably attached to the cover plate 16.

Figure 13:
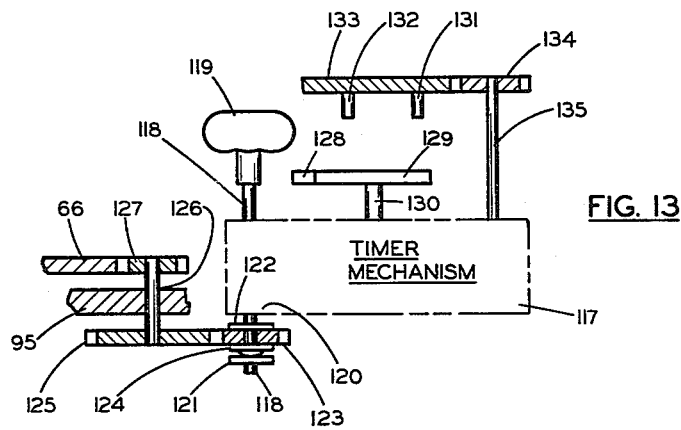
FIGURE 13 is a diagrammatic arrangement of the timer mechanism 117 and associated details.

Extending from the clock mechanism, 117 FIGURE 13, is the shaft 118 which is the equivalent of the winding stem on a spring driven clock, the shaft 118 terminating in a thumb screw winding knob 119. The end of the shaft 118 opposite the thumb screw extends from the clock mechanism 117 at 120 and has the flat circular plates 121 and 122 firmly attached thereto, a gear 123 being located between the plates 121 and 122 and being loosely mounted on the shaft 118. Bearing against the loose gear 123 and the plate 122 is a spring 124, the assembly comprising a form of a slip clutch so that when gear 123 is rotated the spring 124 drives the plates 121 and 122 and shaft 118, thereby winding the coil spring of the clock mechanism 117. However, when the coil spring of the clock mechanism 117 is fully wound, the gear 123 slips relative to the plates 121 and 122 without causing overwinding or strain on the coil spring.

When the mechanism described is applied to control a water softener process it may be desirable to position the valve element 6 in a position delivering soft water to service for a period of forty-eight hours followed by ten minutes in the "wash" position, and sixty minutes in the "salt-rinse" position. Thus, the cam element 129 and latch 105 control the forty-eight hour period, while the gear 133, pins 131 and 132, and latch 106 control the relatively short time periods of ten and sixty minutes. It will be noted that although the mechanism described will control three operating positions of the valve element 6 additional positions can be accommodated easily.

The latch 105 and associate extension 113 on the control plate 73 are actuated by the extension 128 formed on cam 129. The cam 129 is firmly attached to the shaft 130 extending from the clock mechanism 117, the arrangement of the internal gears in the clock mechanism 117 being predetermined to impart a counter-clockwise rotation to the shaft 130, the ratio of the gears being such as to rotate the cam 129 one revolution in forty-eight hours. Thus the extension 128 on the cam 129 will contact the extension 115 on the latch 105, rotating the latch 105 clockwise thereby releasing the control plate 73 which will cause the valve element 6 to rotate to the next (wash) position. Latch 106 will thereafter restrain control plate 73.

The latch 106 and associate extension 114 on control plate 73 are actuated by the pins 131 and 132 which are firmly attached to the gear 133. Gear 133 is mounted on the hollow hub 79 of the cover 78, and is free to rotate but is restrained from axial movement. The gear 133 is driven by the gear 134 which is firmly attached to the shaft 135 extending from the clock mechanism 117. The arrangement of the internal gears in the clock mechanism 117 being predetermined to impart a clockwise rotation to the gear 133, the ratio of the gear being such as to rotate the gear 133 one revolution in two hours. The pin 131 is located on the gear 133 so that it actuates latch 106 ten minutes after valve element 6 has been positioned in the "wash" position. Thus, the pin 131 will contact the extension 115 on the latch 106, rotating the latch 106 clockwise thereby releasing the control plate 73 and causing the valve element 6 to rotate to the next (salt-rinse) position. Latch 106 will thereafter restrain the control plate 73 until the pin 132, which is positioned to actuate the latch 106 sixty minutes after the valve element 6 has been rotated to the salt-rinse position, actuates the latch 106.

Actuation of the latch 106 by the pin 132 will cause the valve element 6 to rotate to the starting position (service), the latch 105 thereafter restraining the control plate 73 until acted upon by the cam 129. The gear 133 will continue to rotate, the pins 131 and 132 actuating the latch 106 without causing rotation of the valve element 6 until cam 129 has released the control plate 73.

The rewinding gear 123 is driven by the gear 125 which is firmly attached to the shaft 126 extending through the flange 95 of the guide block 55. The shaft 126 terminates in the gear 127 which meshes with the gear 66. Thus, whenever gear 66 is rotated, as when the valve element 6 is rotated from one operating position to the next, the spring of the clock mechanism 117 is wound, the winding shaft 118 being driven by the gears 66, 126, 125, loose gear 123, and slip clutch spring 124.

Figure 14:
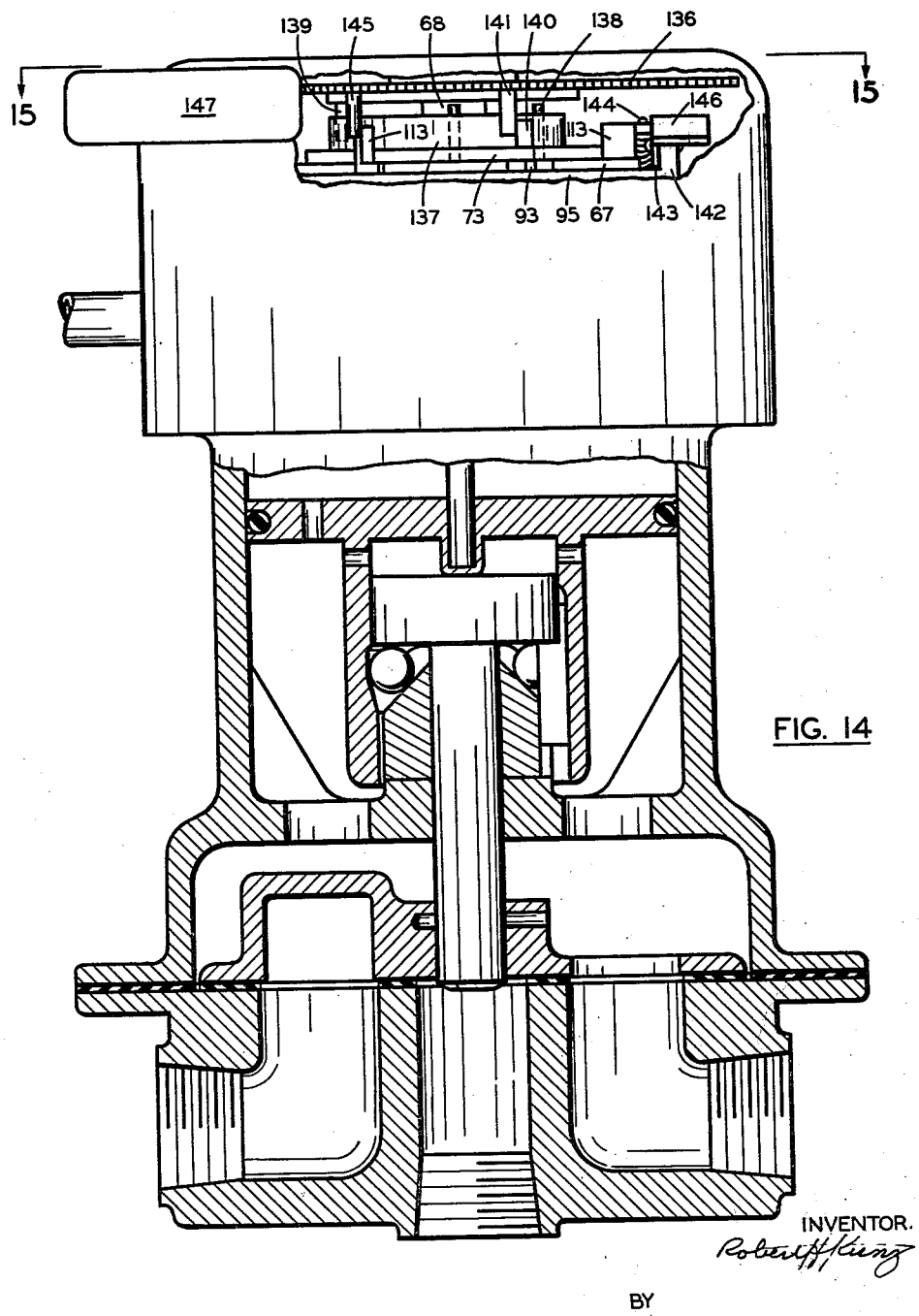
FIGURE 14 is a partial section of an alternate arrangement of FIGURE 1.
Figure 15:
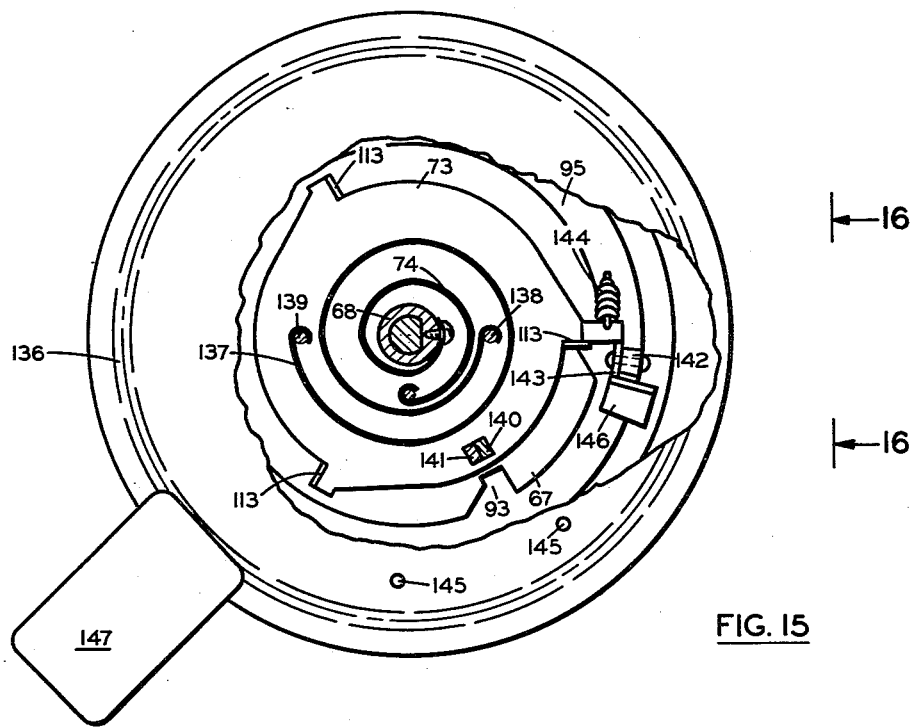
FIGURE 15 is a sectional view taken along the line 15—15 of FIGURE 14.
Figure 16:
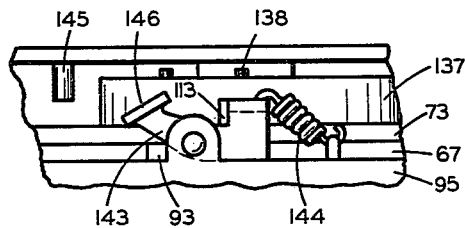
FIGURE 16 is a partial elevation taken along the line 16—16 of FIGURE 15.

With the foregoing and other objects in view, the invention resides in the novel arrangement and combination of parts and in the details of construction heretofore described, it being understood that changes in the precise embodiment of the invention herein disclosed may be made within the scope of what is claimed without departing from the spirit of the invention. Thus, as illustrated in the alternate arrangement shown in FIGURE 14, the operating means may be enclosed in a common housing with the valve element 6, while the timing means may be as indicated in FIGURE 15 wherein the control plate 73, register disc 67, spiral spring 74, and flange 95 function as heretofore described. The gear 136 is mounted on the hub 79 of the cover 78, similar to the gear 133 previously described, and is biased toward counter-clockwise rotation by the spiral spring 137 which is attached by pin 138 to the control plate 73, and by the pin 139 to the gear 136. Spring 137 is wound whenever control plate 73 rotates counter-clockwise. Fixed to the control plate 73 is a stop 140 which contacts a stop 141 fixed to the gear 136 and prevents gear 136 from rotation. It will be noted that the spiral spring 137 could be attached to the hub 68, in a fashion similar to the spring 74, the spring 137 being located between the gear 136 and the spring 74, thereby being wound whenever the valve element 6 is rotated.

Mounted on the boss 142 of flange 95 is a latch 143 which is pinned loosely to the boss 142 and biased into engagement with the extensions 113 by the spring 144. Pins 145 are firmly attached to gear 136 and extend downward so as to contact the shoe 146 of the latch 143 thereby rotating the latch 143 and releasing the extension 113 of the control plate 73. Engaging gear 136 is an escapement 147 controlling the rotation of the gear 136.

In operation it will be noted that latch 143 must be actuated by some external means such as a solenoid responsive to a meter contact. Upon actuation of latch 143, control plate 73 rotates, thereby causing the valve element 6 to rotate, the rotation of the control plate 73 carrying the stop 140 away from the stop 141 on the gear 136, whereby the gear 136 is free to rotate biased by the spring 137. Pins 145 will then actuate latch 143 until the full cycle of positions of valve element 6 has been accomplished. It will be noted that the first rotation of the control plate 73 will carry the stop 140 sufficiently far enough ahead to allow a forty minute time period between stops 140 and 141, and that various combinations of latches and gear 136 speeds will provide for almost any timing cycle requirement. It will be further noted that removal of the stops 140 and 141 will provide a continuous cycle.

It is intended that no limitations be placed on the invention by the specific embodiments disclosed in the foregoing descriptions except as defined by the scope of the appended claims.

What I claim is:

1. In a valve, a multi-chamber body member, a rotatable valve element, a drive shaft connected to said valve element, a portion of said shaft on the periphery of which is formed a helical thread, means concentric to said shaft and co-acting with said thread for rotating said shaft and said valve element in one direction, said means axially movable and responsive to pressure differences thereon, wedge means responsive to axial movement of said means for rotating said shaft for moving said shaft and said valve element in an axial direction, a spring driven timer means for at times producing a pressure difference on said means for rotating said shaft, the timer drive spring operatively connected to said shaft to be rewound by rotation of said shaft whenever said shaft rotates said valve element.

2. In a valve, a multi-chamber body member, a rotatable valve element, a drive shaft connected to said valve element fluid pressure motor means responsive to a pressure differential thereon, means to rotate said shaft and said valve element, said means responsive to movement of said pressure motor means, a spring driven timer means for at times producing a pressure difference on said pressure motor means, the timer drive spring operatively connected to said shaft to be rewound by rotation of said shaft.

3. In a valve, a multi-ported body member, a rotatable valve element, a drive shaft connected to said valve element, a pressure sensitive element movable and responsive to a pressure difference thereon, means operative in response to movement of said pressure sensitive element for rotating said driveshaft and said valve element, switch means for controlling the pressure difference on said pressure sensitive element, a first switch position thereof for effecting a first pressure condition on said pressure sensitive element and move said element from an initial position, and a second switch position thereof for effecting a second pressure condition and move said pressure sensitive element to said initial position, a spring driven timer mechanism, the timer drive spring operatively connected to said pressure sensitive element to effect rewinding of said spring in response to movement of said pressure sensitive element, means operative by said timer mechanism to intermittently and at times actuate said switch means to said first switch position, and means operative in response to movement of said pressure sensitive element to actuate said switch means to said second switch position.

References Cited in the file of this patent
UNITED STATES PATENTS

| | | |
|---|---|---|
| 690,882 | Sears | Jan. 7, 1902 |
| 1,177,609 | Edwards | Apr. 4, 1916 |
| 1,327,567 | Miles | Jan. 6, 1920 |
| 1,932,411 | Johnson | Oct. 31, 1933 |
| 2,106,094 | Griffey et al. | Jan. 18, 1938 |
| 2,314,113 | Watson | Mar. 16, 1943 |
| 2,824,548 | Rocke | Feb. 25, 1958 |
| 2,857,964 | Vore | Oct. 28, 1958 |
| 2,870,788 | Hull et al. | Jan. 27, 1959 |